US012703041B2

(12) United States Patent
Yu et al.

(10) Patent No.: US 12,703,041 B2
(45) Date of Patent: Aug. 11, 2026

(54) ULTRASONIC TRANSDUCER OPERABLE AT MULTIPLE RESONANT FREQUENCIES

(71) Applicant: ASMPT Singapore Pte. Ltd., Singapore (SG)

(72) Inventors: Tsz Kit Yu, Hong Kong (CN); Ka Shing Kwan, Singapore (SG); Hoi Ting Lam, Hong Kong (CN); Hing Leung Li, Hong Kong (CN)

(73) Assignee: ASMPT Singapore Pte. Ltd., Singapore (SG)

( * ) Notice: Subject to any disclaimer, the term of this patent is extended or adjusted under 35 U.S.C. 154(b) by 153 days.

(21) Appl. No.: 18/229,208

(22) Filed: Aug. 2, 2023

(65) Prior Publication Data

US 2024/0116127 A1 Apr. 11, 2024

Related U.S. Application Data

(63) Continuation-in-part of application No. 17/963,489, filed on Oct. 11, 2022, now abandoned.

(51) Int. Cl.
*B23K 20/00* (2006.01)
*B23K 20/10* (2006.01)

(52) U.S. Cl.
CPC .......... *B23K 20/106* (2013.01); *B23K 20/004* (2013.01)

(58) Field of Classification Search
CPC .... B23K 20/106; B23K 20/005; B23K 20/10; B23K 20/004; H01L 2224/78301;
(Continued)

(56) References Cited

U.S. PATENT DOCUMENTS 5,277,355 A * 1/1994 Weaver ................ B23K 20/106 228/4.5
5,469,011 A * 11/1995 Safabakhsh .......... B23K 20/106 228/1.1

(Continued)

FOREIGN PATENT DOCUMENTS

KR 10-2016-0012939 A 2/2016
KR 10-2018-0095779 A 8/2018

OTHER PUBLICATIONS

Notice of Preliminary Rejection mailed Sep. 19, 2024, issued in corresponding Korean Patent Application No. 10-2023-0134090 with English translation.

*Primary Examiner* — Erin B Saad
(74) *Attorney, Agent, or Firm* — OSTROLENK FABER LLP

(57) ABSTRACT

An ultrasonic transducer that is configured to selectively operate at first or second resonant frequency during wire bonding operations includes an elongated transducer body an aperture for mounting a piezoelectric driver stack for driving the ultrasonic transducer to operate at the first or second resonant frequency and a mounting flange connected to the transducer body at a first nodal vibration region of the transducer body when the ultrasonic transducer is operated at the first resonant frequency. The elongated transducer has a length substantially equal to two wavelengths of a first oscillatory wave that is transmitted along the length of the transducer body when the transducer is operated at the first resonant frequency, and substantially equal to a half wave-length of a second oscillatory wave that is transmitted along the length of the transducer body when the transducer is operated at the second resonant frequency.

19 Claims, 6 Drawing Sheets

(58) Field of Classification Search
CPC ....... H01L 2224/85205; H01L 2224/78; H01L 2224/78343; B06B 3/00
See application file for complete search history.

(56) References Cited

U.S. PATENT DOCUMENTS

| | | | | |
|---|---|---|---|---|
| 5,486,733 | A * | 1/1996 | Yamazaki | B23K 20/10 228/110.1 |
| 5,540,807 | A * | 7/1996 | Akiike | B23K 20/10 228/110.1 |
| 5,578,888 | A | 11/1996 | Safabakhsh | |
| 5,595,328 | A | 1/1997 | Safabakhsh et al. | |
| 5,730,832 | A * | 3/1998 | Sato | B29C 66/8322 156/499 |
| 6,189,761 | B1 * | 2/2001 | Kyomasu | B06B 3/00 228/8 |
| 6,719,183 | B2 * | 4/2004 | Kyomasu | B23K 20/004 156/580.2 |
| 6,766,936 | B2 * | 7/2004 | Kyomasu | B06B 3/00 228/180.5 |
| 7,137,543 | B2 * | 11/2006 | DeAngelis | B06B 3/00 228/110.1 |
| 8,052,026 | B2 * | 11/2011 | Kakutani | H01L 24/78 228/110.1 |
| 8,251,275 | B2 * | 8/2012 | DeAngelis | H01L 24/78 228/110.1 |
| 8,800,843 | B2 * | 8/2014 | Aoyagi | H01L 24/78 228/1.1 |
| 9,446,524 | B2 * | 9/2016 | Zhang | B25J 15/0028 |
| 9,640,512 | B2 * | 5/2017 | Song | H01L 24/78 |
| 10,381,321 | B2 * | 8/2019 | DeAngelis | B23K 1/0016 |
| 11,440,131 | B2 * | 9/2022 | Mitsuyuki | B29C 65/08 |
| 11,462,506 | B2 * | 10/2022 | DeAngelis | B23K 20/106 |
| 11,691,214 | B2 * | 7/2023 | Munakata | H01L 24/85 228/1.1 |
| 11,937,979 | B2 * | 3/2024 | DeAngelis | A61B 8/445 |
| 2004/0035912 | A1 * | 2/2004 | Li | B23K 20/106 228/110.1 |
| 2005/0284912 | A1 * | 12/2005 | Zhai | B06B 3/00 228/1.1 |
| 2006/0022016 | A1 * | 2/2006 | DeAngelis | B06B 3/00 228/1.1 |
| 2011/0056267 | A1 * | 3/2011 | Qin | B06B 1/0223 228/1.1 |
| 2011/0226838 | A1 * | 9/2011 | Aoyagi | B23K 20/10 228/1.1 |
| 2012/0125977 | A1 * | 5/2012 | DeAngelis | B23K 20/007 228/110.1 |
| 2013/0240605 | A1 * | 9/2013 | Wong | B23K 20/007 228/1.1 |
| 2016/0023298 | A1 * | 1/2016 | Song | H01L 24/85 228/1.1 |
| 2018/0240774 | A1 * | 8/2018 | DeAngelis | H01L 24/75 |

* cited by examiner

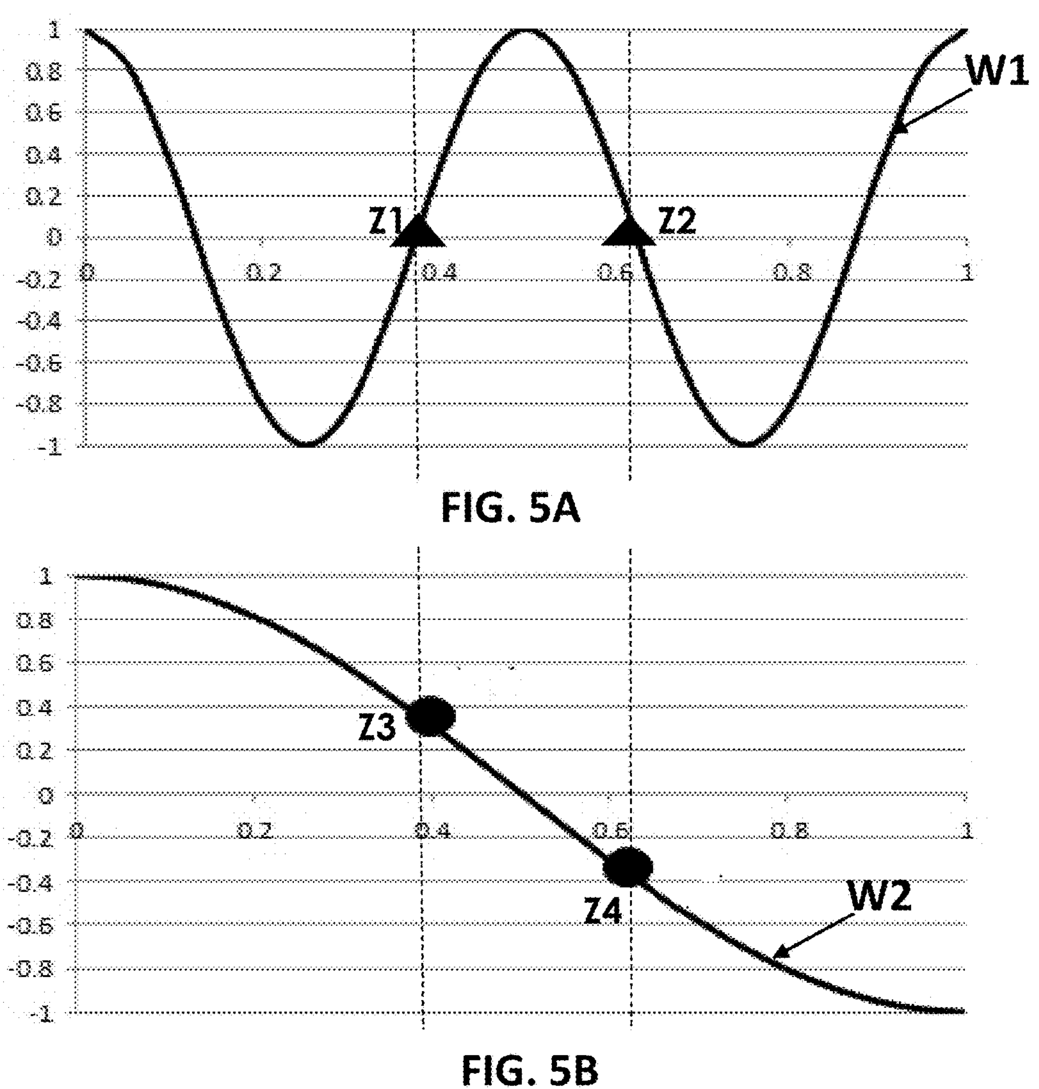
FIG. 5A
FIG. 5B
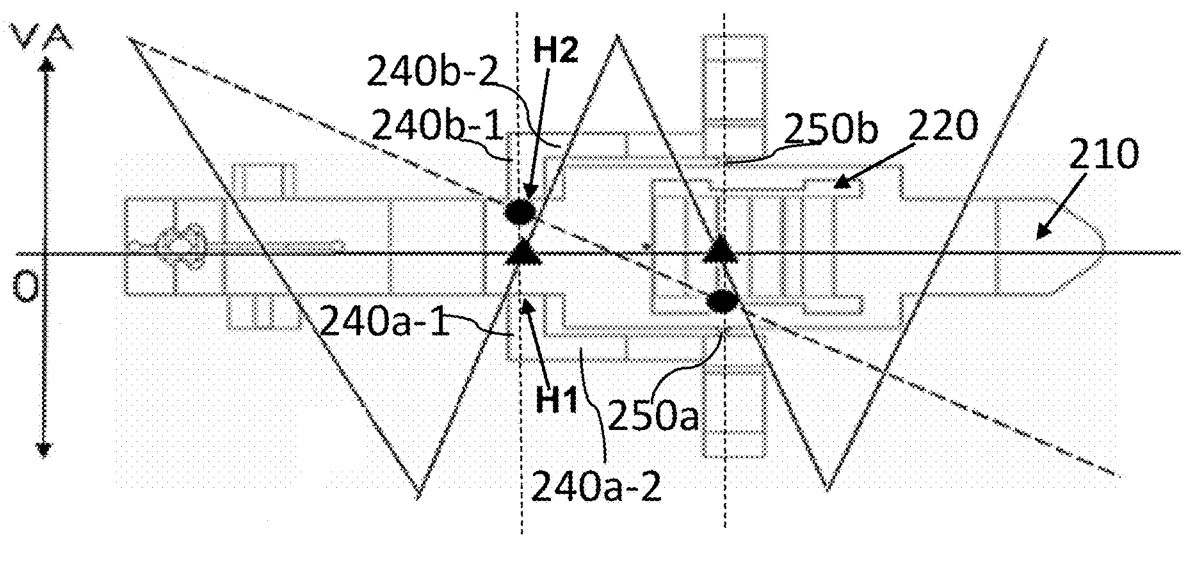
FIG. 5C

ULTRASONIC TRANSDUCER OPERABLE AT MULTIPLE RESONANT FREQUENCIES

CROSS-REFERENCE TO RELATED APPLICATION

This application is a continuation-in-part of U.S. patent application Ser. No. 17/963,489, filed on Oct. 11, 2022, which is incorporated herein by reference in its entirety.

FIELD OF THE INVENTION

The invention generally relates to multi-resonance ultrasonic transducers used with wire bonding tools, and more specifically to an ultrasonic transducer that is operable at multiple resonant frequencies including an ultra-high resonant frequency up to 300 kHz.

BACKGROUND

Ultrasonic transducers have been widely used with wire bonding tools to provide wire bonds between semiconductor bond pads and lead frames or carriers during wire bonding operations. Typically, conventional ultrasonic are produced with a single operable resonant frequency for making reliable wire bonds. However, in reality, more than one resonant frequency may be needed during wire bonding operations, and various solutions have been proposed in the prior art to provide an ultrasonic transducer that is operable in practice at more than one resonant frequency.

U.S. Pat. No. 7,137,543B2 proposed an ultrasonic transducer 100A suitable for use at multiple ultrasonic frequencies. Referring to FIG. 1A, the ultrasonic transducer includes an integrated flexure mount scheme 108*a*-108*d* for each mounting flange 105, to prevent vibrations from being transmitted from the ultrasonic transducer 100A to a machine bond head of a wire bonding machine to which the ultrasonic transducer 100A is mounted. However, as flexures are a type of structure intentionally weakened in one direction for stress relief, the integrated flexure mount scheme 108*a*-108*d* would be lower in stiffness in the weakened direction, i.e., the axial direction of the ultrasonic transducer. This will affect the stability of the ultrasonic transducer 100A, thereby reducing the quality of the wire bonds.

U.S. Pat. No. 5,578,888A proposed an ultrasonic transducer 100B having usable lower and higher resonant frequencies. Such an ultrasonic transducer 100B as shown in FIG. 1B includes an integral unibody with a rectangular aperture in the center of its mass. A multi-frequency stack of transducer drivers 28 is mounted in the rectangular aperture 31 with compression wedges 29. The structure of this ultrasonic transducer 100B, especially the fixed location of the rectangular aperture 31, limits the frequency separation between its higher and its lower resonant frequencies. For the ultrasonic transducer 100B, the higher resonant frequency is only about twice the lower resonant frequency. Thus, this prior art ultrasonic transducer 100B is only operable at a limited frequency range.

U.S. Pat. No. 5,595,328A proposed a self-isolating ultrasonic transducer 100C, which is a low mounting impedance ultrasonic transducer 100C as shown in FIG. 1C. It includes two modified mounting flanges 13 for mounting the ultrasonic transducer 100C on a bonding machine through mounting holes 15. Each modified mounting flange 13 includes an aperture 21, i.e., a stress relief slot, in the mounting flange 13 or a transducer body 14 to isolate transversal radial stress in the transducer body 14 from entering into the mounting flange 13 and coupling to the bonding machine. This ultrasonic transducer 100C cannot operate well at multiple ultrasonic frequencies unless a common mounting node can be identified on the transducer body 14 for the multiple ultrasonic frequencies. Moreover, the stress relief slot on the mounting flange 13 or the transducer body 14 will reduce the bending stiffness of the ultrasonic transducer 100C.

It would therefore be beneficial to provide a new design of ultrasonic transducers that are operable at multiple resonant frequencies which can overcome at least one of the shortcomings in the prior art ultrasonic transducers mentioned above.

SUMMARY OF THE INVENTION

It is thus an object of the invention to seek to provide an improved multi-resonance ultrasonic transducer that are operable at a first (higher) resonant frequency as well as a second (lower) resonant frequency. The latter may be less than one third of the first resonant frequency.

According to a first aspect of the present invention, there is provided an ultrasonic transducer configured to selectively operate at a first resonant frequency or a second resonant frequency during wire bonding operations. The ultrasonic transducer comprises an elongated transducer body with an aperture for mounting a piezoelectric driver stack for driving the ultrasonic transducer to operate at the first or second resonant frequency, wherein the transducer body has a length substantially equal to two wavelengths of a first oscillatory wave that is transmitted along the length of the transducer body when the transducer is operated at the first resonant frequency, and substantially equal to a half wavelength of a second oscillatory wave that is transmitted along the length of the transducer body when the transducer is operated at the second resonant frequency, and a mounting flange connected to the transducer body at a first nodal vibration region of the transducer body when the ultrasonic transducer is operated at the first resonant frequency.

In some embodiments of the invention, the first resonant frequency may be between 200 kHz and 300 kHz, and the second resonant frequency may be between 50 kHz and 100 kHz.

In some embodiments of the invention, it is not required to position the ultrasonic transducer in a way that its center of mass aligns with the center of the aperture for mounting the piezoelectric driver. The transducer body of the ultrasonic transducer has a first end and a second end opposite to the first end. The aperture may be closer to the first end than the second end. In one embodiment, the second end may be the end of the transducer body to which a bonding tool is attached. With this arrangement, the aperture is situated at a considerable distance from the bonding tool, which allows the ultrasonic transducer to be constructed with a more robust or durable structure, ensuring better bonding quality.

To further minimize vibration and rotation of the transducer body during wire bonding operations, the ultrasonic transducer may further include at least one resilient preloading element located in the aperture to provide a preloading structure having a non-uniform thickness for generating a preload force against the piezoelectric driver stack. The at least one resilient preloading element may be positioned on an internal surface of the aperture.

In some embodiments, the ultrasonic transducer may further include a flexible connecting member extending between the mounting flange and the transducer body at the first nodal vibration region of the transducer body. In one embodiment, the flexible connecting element may include at least one flexure extending between the mounting flange and the transducer body.

In some embodiments, the ultrasonic transducer may further include a rigid connecting member which has a first end connected to the mounting flange and a second end connected to the transducer body at a second nodal vibration region of the transducer body when the ultrasonic transducer is operated at the first resonant frequency. In one embodiment, the rigid connecting member may include a first portion extending from the second nodal vibration region of the transducer body in a direction perpendicular to an axial direction of the transducer body, and a second portion extending from the first portion along the axial direction of the transducer body, the second portion being connected to the mounting flange.

Both the flexible connecting member and the rigid connecting member are attached to the nodal vibration regions of the transducer body which have a minimum vibration amplitude when the ultrasonic transducer is operated at the first resonant frequency so as to minimize the vibration to be transmitted to the mounting flange when the ultrasonic transducer is operated at the first resonant frequency.

In one embodiment, the minimum vibration amplitude may be a vibration amplitude not higher than 10% of a maximum vibration amplitude of the transducer body when the ultrasonic transducer is operated at the first resonant frequency.

In some embodiments, the first nodal vibration region is located closer to a bonding tool compared to the second nodal vibration region, and the second nodal vibration region is located adjacent to the rectangular aperture.

In some embodiments, the rigid connecting member may include a first portion extending from the second nodal vibration region of the transducer body in a direction perpendicular to an axial direction of the transducer body, and a second portion (a long supporting arm) extending from the first portion along the axial direction of the transducer body till the second portion is connected to the mounting flange. The rigid connecting member is designed to increase the stiffness of the mounting flange and relieve the radial stress caused by the vibration of the transducer body during wire binding processes. Preferably, a length of the second portion of the rigid connecting member is approximately half of a wavelength of a sinusoidal ultrasonic signal being used to drive the ultrasonic transducer at the first resonant frequency.

In order to increase the bending stiffness of the ultrasonic transducer, a ratio Rh of a height of the first portion in a first direction perpendicular to the axial direction of the transducer body, e.g., z-axis direction, to a thickness of the second portion in a second direction perpendicular to the axial direction of the transducer body, e.g., x-axis direction, is selected such that: $Rh^2>Rb$, wherein Rb refers to a predetermined ratio of a bending stiffness around the second direction to a bending stiffness about the first direction. In one embodiment, the predetermined ratio Rb is 10, accordingly, the height of the first portion in the second direction is not less than 3.2 times the thickness of the second portion in the first direction.

In some embodiments, the ultrasonic transducer may be configured to operate at a second resonant frequency lower than the first resonant frequency. In order to further isolate the vibration of the transducer body from being transmitted to the wire bonding machine when the ultrasonic transducer is operated at the second resonant frequency, a first vibration point at the first nodal vibration region of the transducer body and a second vibration point at the second nodal vibration region have substantially equal vibration amplitudes and opposite vibration directions when the ultrasonic transducer is operated at the second resonant frequency. In other words, the rigid connecting member and the flexible connecting member are respectively attached to the first and second nodal vibration regions which have substantially equal vibration amplitudes and opposite vibration directions when the ultrasonic transducer is operated at the second resonant frequency. With the novel arrangement of the ultrasonic transducer, the second resonant frequency may be less than one third of the first resonant frequency.

In some embodiments of the invention, the mounting flange may include two parts that are symmetrically arranged on opposite sides of the transducer body, accordingly both the rigid connecting member and the flexible connecting member include two separate parts symmetrically arranged on opposite sides of the transducer body.

According to a second aspect of the present invention, there is provided an ultrasonic wire bonding device which includes the ultrasonic transducer according to various embodiments of the invention.

These and other features, aspects, and advantages will become better understood with regard to the description section, appended claims, and accompanying drawings.

BRIEF DESCRIPTION OF THE DRAWINGS

Embodiments of the present invention will now be described, by way of example only, with reference to the accompanying drawings, in which:

FIG. 5A and FIG. 5B respectively show schematic waveforms of displacement versus length of the transducer body when the ultrasonic transducer is operated at the first (higher) and the second (lower) resonant frequencies.

FIG. 5C shows a top view of the ultrasonic transducer with the schematic waveforms as shown in FIG. 5A and FIG. 5B indicating vibration amplitudes of the ultrasonic transducer when it is operated at the lower and higher resonant frequencies.

In the drawings, like parts are denoted by like reference numerals.

DETAILED DESCRIPTION OF THE PREFERRED EMBODIMENTS OF THE INVENTION

Figure 1A:
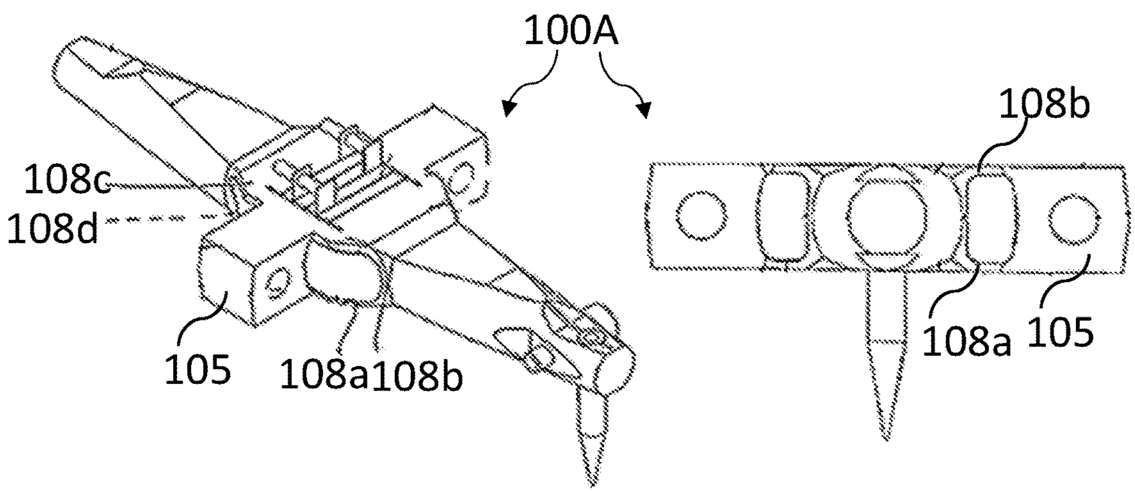
FIG. 1A shows perspective and front views of a first prior art ultrasonic transducer.
Figure 1B:
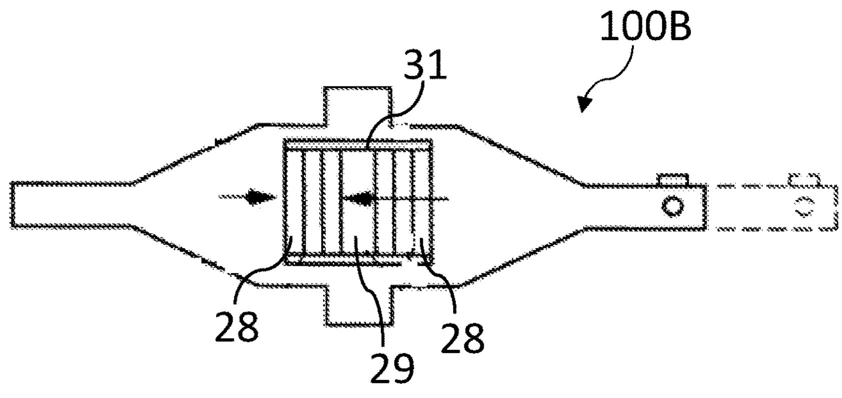
FIG. 1B shows a top view of a second prior art ultrasonic transducer.
Figure 1C:
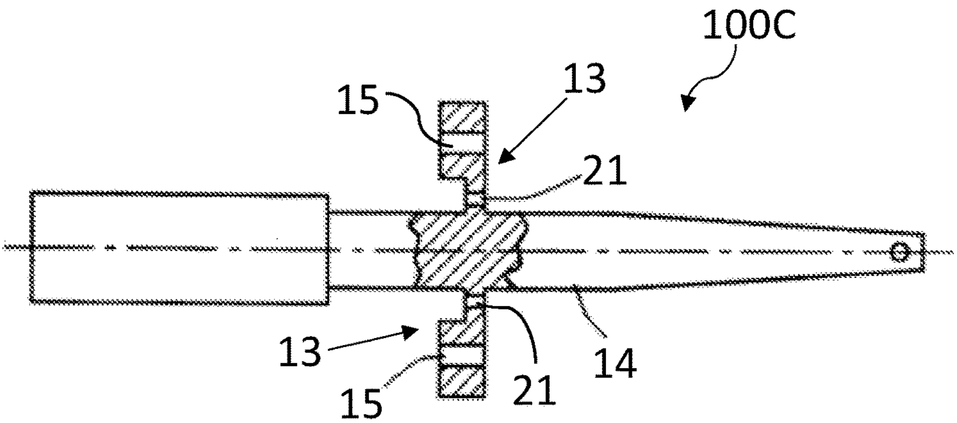
FIG. 1C shows a top view of a third prior art ultrasonic transducer.
Figures 2A, 2B:
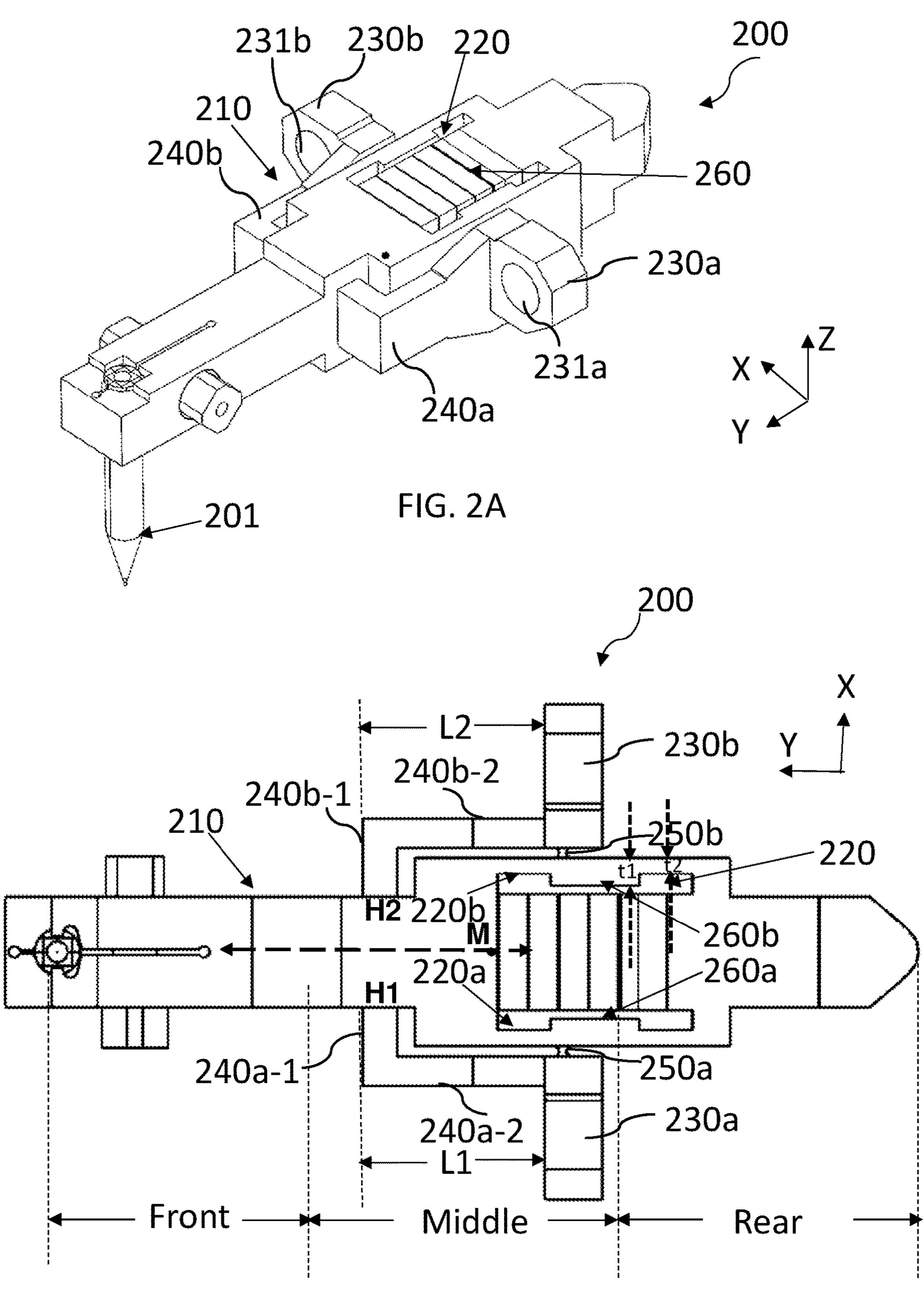
FIG. 2A and FIG. 2B respectively show perspective and top views of an ultrasonic transducer according to one preferred embodiment of the invention.

FIG. 2A and FIG. 2B respectively show perspective and top views of an ultrasonic transducer 200 according to one preferred embodiment of the invention. The ultrasonic transducer 200 is operable at multiple frequencies. The multiple frequencies include a first (higher) resonant frequency and a second (lower)resonant frequency. The first resonant frequency may be between 200 kHz and 300 kHz and the second resonant frequency may be between 50 kHz and 100 kHz.

As shown in FIGS. 2A and 2B, the ultrasonic transducer 200 includes an elongated transducer body 210 with a rectangular aperture 220, a mounting flange including first and second flange elements 230*a*, 230*b*, a rigid connecting member including first and second rigid connecting elements 240*a*, 240*b*, and a flexible connecting member including first and second flexible connecting elements 250*a*, 250*b*.

The elongated transducer body 210 has one end to which a bonding tool 201 of a wire bonding machine is mounted. One benefit is that ultrasonic scrub assist may be added to pressure and heat during the bonding process to form a thermosonic bond with the bonding tool 201. As shown in FIG. 2B, the transducer body 210 generally includes three portions, i.e., front, middle and rear portions. The rectangular aperture 220 is approximately located between the middle and rear portions of the transducer body 210. The center of mass M of the ultrasonic transducer 200 is indicated in FIG. 2B, which is noticeably not located at the center of the rectangular aperture 220. The rectangular aperture 220 is adapted for mounting a piezoelectric driver stack 260 of the ultrasonic transducer 200 for driving the ultrasonic transducer 200 to operate at multiple frequencies.

The mounting flange is provided for mounting the transducer body 210 to a wire bonding machine. The mounting flange in this embodiment includes the first flange element 230*a* and the second flange element 230*b*. The first and second flange elements 230*a*, 230*b* are symmetrically disposed on opposite sides of the transducer body 210. Each flange element 230*a*, 230*b* includes a mounting hole 231*a*, 231*b* for receiving a screw in order to mount the transducer body 210 to a wire bonding machine.

The rigid connecting member is provided to establish a rigid connection between the transducer body 210 and the mounting flange to improve the stiffness of the ultrasonic transducer 200. In this embodiment, the rigid connecting member includes the first and second rigid connecting elements 240*a*, 240*b*. Referring to FIGS. 2A and 2B, the first rigid connecting element 240*a* has a first end that is connected to the transducer body 210 at a first point H1 at a first nodal vibration region of the transducer body 210 when the ultrasonic transducer 200 is operated at the higher resonant frequency, and a second end that is connected to the first flange element 230*a*. The second rigid connecting element 240*b* has a first end that is connected to the transducer body 210 at a second point H2 at the first nodal vibration region of the transducer body 210 when the ultrasonic transducer 200 is operated at the first resonant frequency. The first point H1 and the second point H2 are located on opposite sides of the transducer body 210. A nodal vibration region refers to a region of the transducer body 210 that has a lower vibration amplitude compared to other (non-nodal) regions of the transducer body 210, e.g., a vibration amplitude that is not higher than 10% of the maximum vibration amplitude of the transducer body 210 when the ultrasonic transducer 200 is operated at the first resonant frequency. A method for determining the first nodal vibration region of the transducer body 210 will be explained below.

Referring to FIG. 2A and FIG. 2B, the first rigid connecting element 240*a* includes a first portion 240*a*-1 and a second portion 240-2. The first portion 240-1 extends from the first point H1 on the transducer body 210 in an X-axis direction that is perpendicular to an axial direction (or Y-axis direction) of the transducer body 210, and the second portion 240*a*-2 extends from an end of the first portion 240*a*-1 along a direction parallel to the axial direction of the transducer body 210, i.e., along the Y-axis direction. The second portion 240*a*-2 is then connected to the first flange element 230*a* emanating from the transducer body 210. Similarly, the second rigid connecting element 240*b* includes a first portion 240*b*-1 and a second portion 240*b*-2. The first portion 240*b*-1 extends from the second point H2 on the transducer body 210 in the X-axis direction and the second portion 240*b*-2 extends from an end of the first portion 240*b*-1 along the Y-axis direction. The second portion 240*b*-2 is connected to the second flange element 230*b* emanating from the transducer body 210.

When the ultrasonic transducer 200 is actuated to vibrate along the axial direction of the transducer body 210, a radial stress generated by the compression and extension of a horn of the transducer body 210 will be transmitted to the mounting flange through the rigid connecting member 240*a*, 240*b*. As the second portion 240*a*-2, 240*b*-2 of the rigid connecting member 240*a*, 240*b* is designed to provide bending degrees of freedom, the radial stress caused by vibration of the transducer body 210 is configured to be reduced by a deformation of the second portion 240*a*-2, 240*b*-2 when it bends. When the second portion 240*a*-2, 240*b*-2 is of a sufficient length, the radial stress may be reduced drastically at the mounting flange. In this embodiment, the length L1, L2 of the second portion 240*a*-2 and 240*b*-2 is approximately half of a wavelength of a sinusoidal ultrasonic signal being used to drive the ultrasonic transducer 200 at the first resonant frequency. Preferably, the length L1 of the second portion 240*a*-2 is substantially equal to the length L2 of the second portion 240*b*-2.

Figure 3:
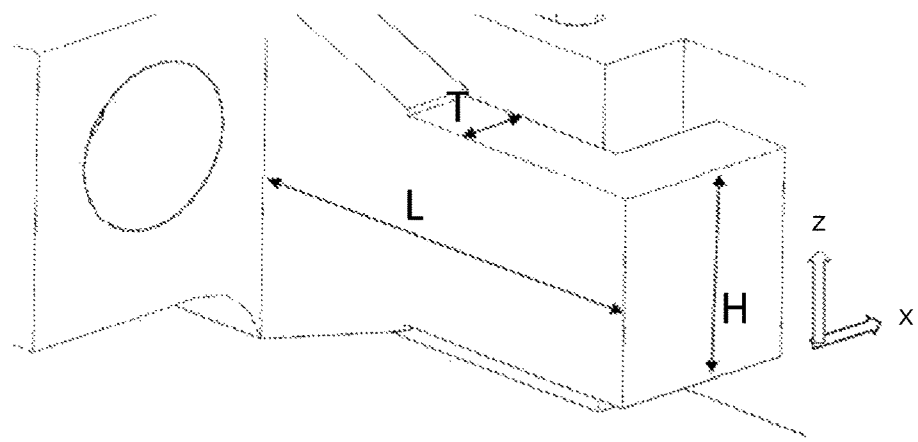
FIG. 3 is an enlarged perspective view of a rigid connecting member of the ultrasonic transducer as shown in FIG. 2A.

FIG. 3 is an enlarged perspective view of the rigid connecting member of the ultrasonic transducer 200 as shown in FIG. 2A. To improve the stiffness of the ultrasonic transducer 200, the rigid connecting member is designed to enhance a bending stiffness Bx about the X-axis direction of the ultrasonic transducer 200 but to weaken a bending stiffness Bz about the Z-axis direction for stress relief. Accordingly, a ratio Rh of a height H of the first portion 240*b*-1 in the Z-axis direction to a thickness T of the second portion 240*b*-2 in the X-axis direction may be determined based on a predetermined ratio Rb of Bx to Bz. Specifically, Bx is related to $TH^3$ and Bz is related to $HT^3$, the ratio Rh accordingly may be determined according to the formula $Rh^2>Rb$. In one example, the predetermined ratio Rb is 10, the ratio Rh of H to T can be calculated according to the equations below:

$$Rb=Bx/Bz=TH^3/HT^3=(H/T)^2$$

$$Rh=H/T=Rb^{1/2}>10^{1/2}=3.16\approx 3.2$$

In this embodiment, to ensure that the ultrasonic transducer 200 has sufficient stiffness, the height H of the first portion 240*b*-1 in the Z-axis direction may be at least 3.2 times the thickness T of the second portion 240*b*-2 in the X-axis direction.

Referring to FIG. 2B, the flexible connecting member includes the first and second flexible connecting elements 250*a*, 250*b*. The first flexible connecting element 250*a* extends between the first flange element 230*a* and the transducer body 210 and the second flexible connecting element 250*b* extends between the second flange element 230*b* and the transducer body 210. The first and second flexible connecting elements 250*a*, 250*b* are respectively located on the transducer body 210 at first and second points of a second nodal vibration region of the transducer body 210 when the ultrasonic transducer 200 is operated at the first resonant frequency.

Figure 2C:
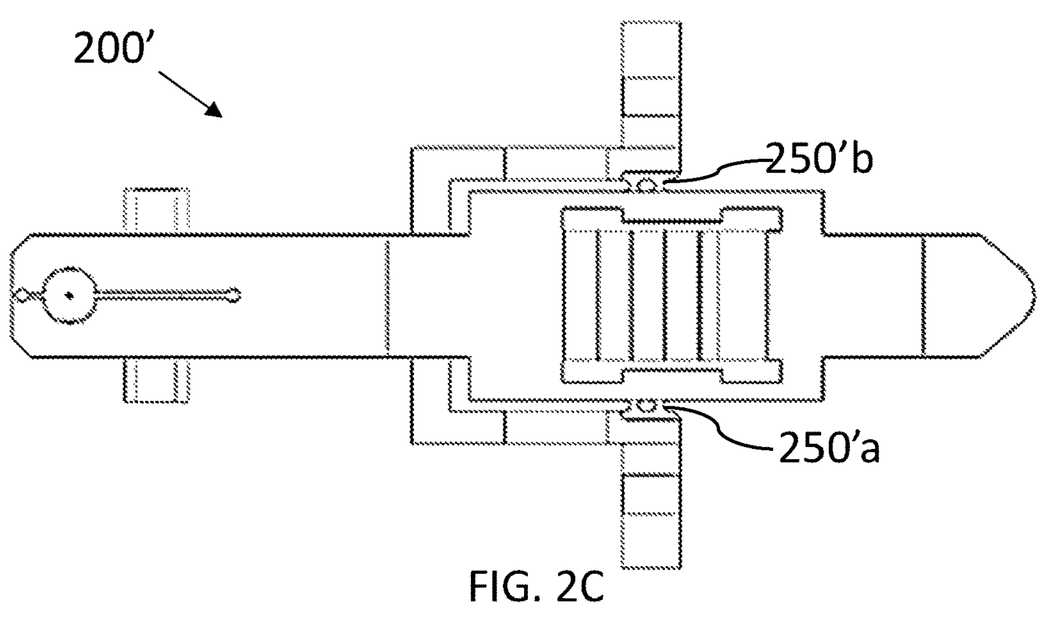
FIG. 2C is a top view of an ultrasonic transducer according to an alternative embodiment of the invention.

FIG. 2C is a top view of an ultrasonic transducer 200' according to an alternative embodiment of the invention. It is different from the ultrasonic transducer 200 shown in FIG. 2B in that each flexible connecting element 250'*a*, 250'*b* includes two flexures extending between each mounting flange and the transducer body 210, instead of one.

Figure 4:
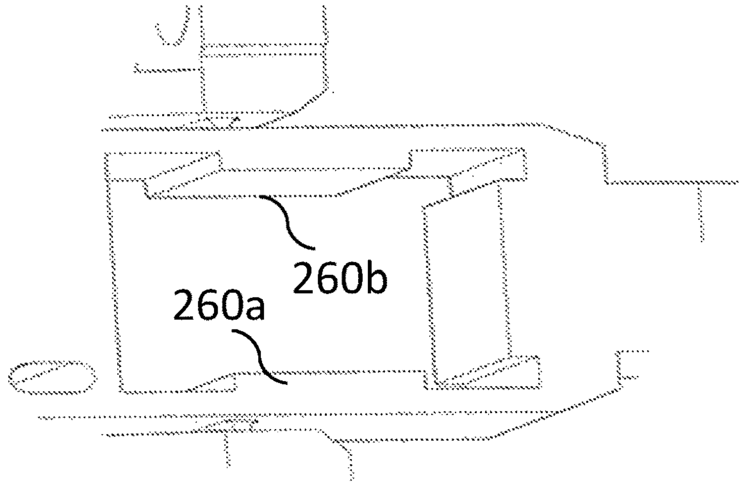
FIG. 4 is an enlarged perspective view of a preloading structure with non-uniform thickness in an aperture of the ultrasonic transducer as shown in FIG. 2A.

The ultrasonic transducer 200 may further include at least one flexible or elastic preloading element located on an internal surface of the aperture 220 to form a preloading structure with non-uniform thickness within the aperture 220 for preloading the piezoelectric driver stack 260. In this embodiment, referring to FIG. 2B and FIG. 4, the flexible preloading member includes a first preloading element 260*a* extending or protruding from a middle part of an internal surface 220*a* of the aperture 220 and a second preloading element 260*b* extending or protruding from the internal surface 220*b* of the aperture 220. The flexible preloading member located on the internal surfaces 220*a*, 220*b* of the rectangular aperture 220 forms a non-uniform preloading structure or flexure in the rectangular aperture 220 to further reduce undesirable bending of the transducer body 210 when the ultrasonic transducer 200 is operated at the higher resonant frequency.

As shown in FIG. 2B, the non-uniform preloading structure in this embodiment includes a section having a first thickness t1 and other sections having a second thickness t2. Specifically, the first and second preloading elements 260*a*, 260*b* have the first thickness t1 which is greater than the second thickness t2 of other sections of the preloading structure. The non-uniform preloading structure provides more freedom for selecting attachment points for the flexible connecting members 250*a*, 250*b* so as to minimize vibration and rotation of the transducer body 210, thereby significantly eliminating undesirable bending of the transducer body 210 when the ultrasonic transducer 200 is operated at the first resonant frequency. In other words, the preloading structure having a non-uniform thickness can minimize the number of local bending modes that affect the shape of the ultrasonic transducer 200 during operations. The non-uniform preloading structure is designed such that the flexures 250*a*, 250*b* are attached to positions on the transducer body 210 which have a minimum bending vibration. Therefore, the arrangement of the non-uniform preloading structure on the internal surface of the aperture 220 can minimize the mounting impedance of the ultrasonic transducer 200 when it is operated at the first resonant frequency.

The method for determining the first and second nodal vibration regions of the transducer body 210 will now be explained. Both the first and second nodal vibration regions are selected based on a predetermined vibration amplitude of the transducer body 210 when the ultrasonic transducer 200 is operated at the first resonant frequency. In this embodiment, the selected first and second nodal vibration regions have vibration amplitudes that are not higher than 10% of the maximum vibration amplitude of the transducer body 210 when the ultrasonic transducer 200 is operated at the first (higher) resonant frequency.

Furthermore, the first and second nodal vibration regions may also be determined based on a displacement waveform against length of the ultrasonic transducer 200 when the ultrasonic transducer 200 is operated at the first and second resonant frequencies. FIGS. 5A-5B respectively show schematic displacement waveforms against length of the transducer body 210 when the ultrasonic transducer 200 is operated at the first and the second resonant frequencies respectively. FIG. 5C shows a top view of the ultrasonic transducer 200 with the schematic waveforms as shown in FIG. 5A and FIG. 5B indicating vibration levels or vibration amplitudes at each region of the ultrasonic transducer 200 when it is operated at the first and second resonant frequencies. Referring to FIG. 5A, the first nodal vibration point H1, H2 is determined based on the first node Z1 and the second nodal vibration region is determined based on the second node Z2. The first nodal vibration region is a region around the first node Z1, this region having a vibration amplitude that is less than a predetermined vibration amplitude, e.g., less than 0.1 of the maximum vibration amplitude of the transducer body 210 when the ultrasonic transducer 200 is operated at the first resonant frequency. The second nodal vibration region is a region around the second node Z2, and this region also has a vibration amplitude that is less than the predetermined vibration amplitude. Referring to FIGS. 2B and 5C, the first nodal vibration region is located closer to the end coupled to the bonding tool 201 as compared with the second nodal vibration region, and the second nodal vibration region is located adjacent to the rectangular aperture 220.

Referring to FIG. 5A to FIG. 5C, the elongated transducer body 210 has a length substantially equal to two wavelengths of the first oscillatory wave W1 that is transmitted along the length of the transducer body 210 when the ultrasonic transducer 200 is operated at the first resonant frequency, and substantially equal to a half wavelength of a second oscillatory wave W2 that is transmitted along the length of the transducer body 210 when the ultrasonic transducer 200 is operated at the second resonant frequency. The length of the transducer body 210 includes the length of the front, middle and rear portions of the ultrasonic transducer 200 as shown in FIG. 2.

Referring to FIG. 5A and FIG. 5C, when the ultrasonic transducer 200 is operated at the first resonant frequency, the rigid connecting member is attached to the first and second points H1, H2 of the transducer body 210 where the transducer body 210 has the lowest vibration amplitude. In order to increase the stiffness of the ultrasonic transducer 200, in an approach that is different from the prior art transducer in which stress-relief slots on the mounting flange or the transducer body are used to relieve radial stress, a long solid arm separate from the mounting flange and the transducer body 210 (i.e., the second portion 240*a*-2, 240*b*-2 of each rigid connecting member 240*a*, 240*b*) is used to relieve the radial stress. To further increase the stiffness of the mounting flange, the flexible connecting member including at least one flexure is used to connect the mounting flange and the transducer body 210. With these two connection points which are spaced along the transducer body 210, the rotational stiffness of the ultrasonic transducer 200 can be further improved. The flexible connecting member (i.e., the flexures 250*a*, 250*b*) is attached to the second nodal vibration region to achieve a minimum vibration, especially a low bending moment around the flexures 250*a*, 250*b*.

Referring to 5B and 5C, when the ultrasonic transducer 200 is operated at the second resonant frequency, the vibration levels or vibration amplitudes of the vibration at the first and second nodal vibration regions of the transducer body 210 (e.g., the vibration amplitudes at Z3, Z4 are higher than the vibration amplitudes of the vibration at the first and second nodal vibration regions of the transducer body 210 (e.g., the vibration amplitudes at Z1, Z2) when the ultrasonic transducer 200 is operated at the higher resonant frequency. However, the vibrations at the first and second nodal vibration regions have substantially equal amplitudes and are in opposite vibrational directions. That is to say, when the ultrasonic transducer 200 is operated at the second resonant frequency, the connection points of the rigid connecting member and the flexible connecting member are vibrating in opposite directions with the same vibration amplitude. With the opposite vibrational directions, a minimum vibration region that is suitable for the mounting flange can be identified. With the flexible connecting member, i.e., the flexures 250*a*, 250*b* extending between the mounting flange and the transducer body 210, the vibration of the transducer body 210 will be isolated from the neighboring region, especially to the rest of the bonding machine. The vibration at the mounting flange will be significantly reduced, thereby achieving a reduced mounting impedance for lower resonance actuation.

Figure 6A:
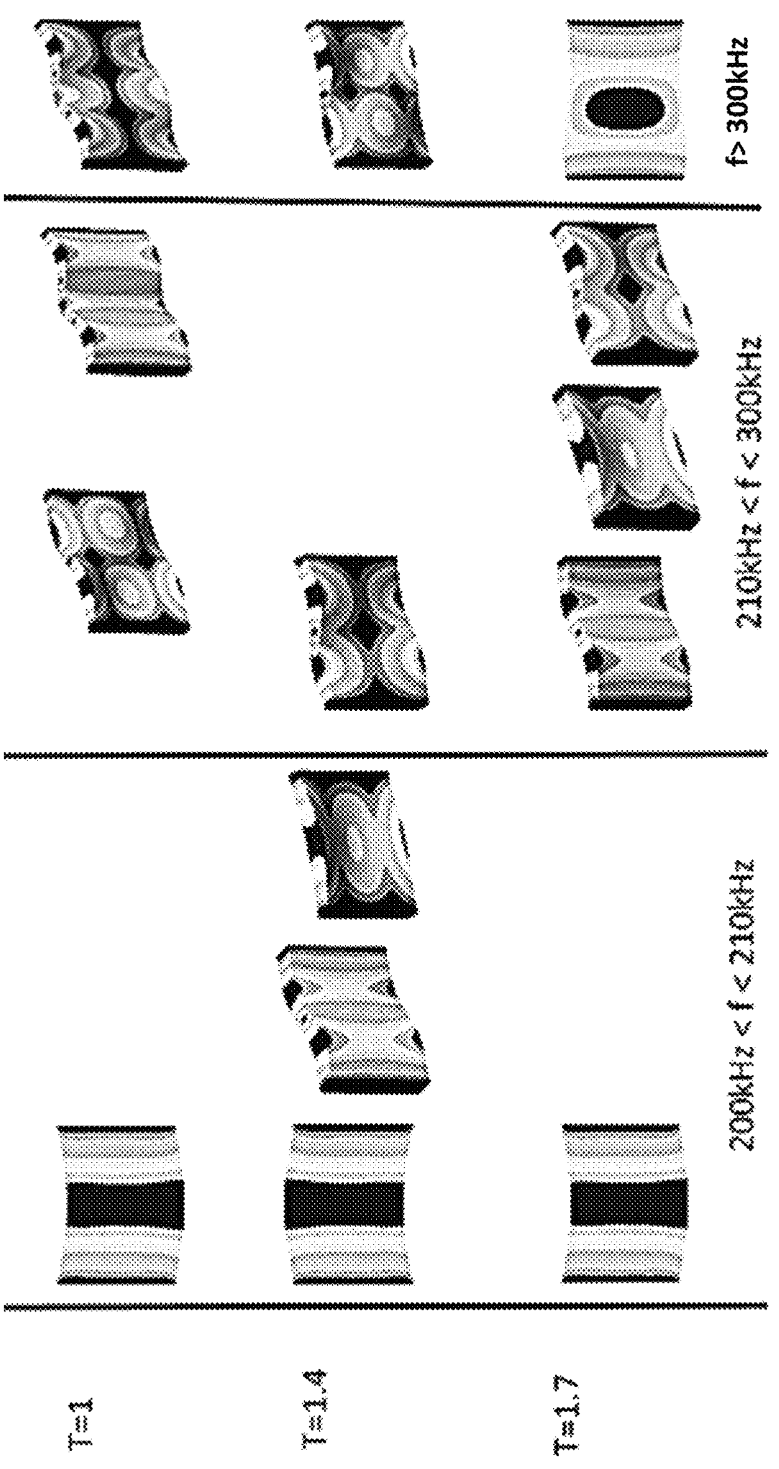
FIG. 6A shows simulation results of vibration shapes of an ultrasonic transducer with a preloading structure having a uniform thickness.

FIG. 6A shows simulation results of vibration shapes of an ultrasonic transducer with a preloading structure having a uniform thickness when the ultrasonic transducer is operated at a frequency fin the range of 200 kHz<f<210 kHz, 210 kHz<f<300 kHz, and f>300 kHz respectively. The simulation results for the preloading structure with a uniform thickness T=1 mm, 1.4 mm or 1.7 mm have been set out in FIG. 6A. The number of vibration shapes that appears in the frequency range is used to indicate the vibration level of the transducer body when it is operated at different frequency ranges. Referring to FIG. 6A, when the thickness T is 1 mm, there are four vibration shapes in the frequency range greater than 200 kHz; when the thickness T is 1.4 mm or 1.7 mm, there are five vibration shapes in the frequency range greater than 200 kHz. In particular, there is at least one vibration shape in the high frequency range from 200 kHz to 300 kHz regardless of the value of the thickness of the preloading structure.

Figure 6B:
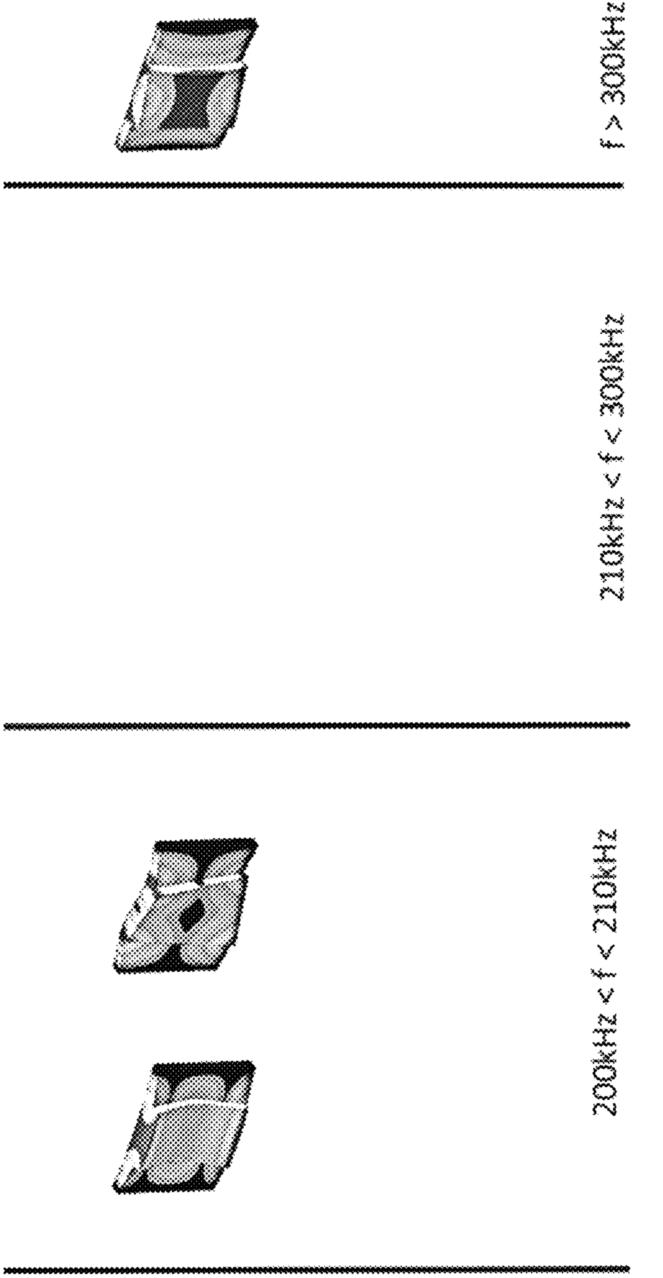
FIG. 6B shows simulation results of vibration shapes of an ultrasonic transducer with a preloading structure having a non-uniform thickness.

FIG. 6B shows simulation results of vibration shapes of an ultrasonic transducer with a preloading structure having a non-uniform thickness when the ultrasonic transducer is operated at a frequency fin the range of 200 kHz<f<210 kHz, 210 kHz<f<300 kHz, and f>300 kHz. As shown in FIG. 6B, the total number of vibration shapes that appear in the frequency range greater than 200 kHz is three, less than the number of vibration shapes that appear in the frequency range greater than 200 kHz when the preloading structure has a uniform thickness. Specifically, two vibration shapes appear in the resonant frequency range of 200 kHz<f<210 kHz, one in the range of f>300 kHz, and no vibration shape appears in the high resonant frequency range of 210 kHz<f<300 kHz. Therefore, the simulation results prove that the non-uniform preloading structure is significantly effective for eliminating the vibration of the transducer body, especially when the ultrasonic transducer is operated at a high resonant frequency of up to 300 kHz.

As will be appreciated from the above description, embodiments of the invention provide an ultrasonic transducer that may be operable at multiple resonant frequencies, including an ultra-high resonant frequency of up to 300 kHz. Compared to prior art ultrasonic transducers, the ultrasonic transducers provided in embodiments of the invention includes an elongated transducer body that has a length determined by the multiple operable resonant frequencies. Specifically, the length of the transducer body is substantially equal to two wavelengths of a first oscillatory wave that is transmitted along the length of the transducer body when the transducer is operated at the first (higher) resonant frequency, and substantially equal to a half wavelength of the second (lower) oscillatory wave that is transmitted along the length of the transducer body when the transducer is operated at the second resonant frequency.

In one embodiment, the ultrasonic transducer may include a rigid connecting member which is used to connect a first nodal vibration region when the ultrasonic transducer is operated at a higher resonant frequency with the mounting flange so as to improve bending stiffness of the ultrasonic transducer. Also, the rigid connecting member includes a long supporting arm extending along an axial direction of the transducer body for radial stress relief. Furthermore, the ultrasonic transducer may further include the mounting flange that is connected to a second nodal vibration region when the ultrasonic transducer is operated at the higher resonant frequency through a flexible connecting member to further increase the bending stiffness of the mounting flange and to isolate vibrations from the rest of the bonding machine through the mounting flange. The first and second nodal vibration regions are selected such that the vibrations at these two regions have substantially equal vibration amplitudes and opposite vibration directions when the ultrasonic transducer is operated at the lower resonant frequency, thus the vibration transmitted from the transducer body to the mounting flange will be balanced and negated when the ultrasonic transducer is operated at the lower resonant frequency. The proposed ultrasonic transducer can therefore maintain an effective mounting while maintaining distinct vibration modes regardless of which operating resonant frequency it is operated at. In addition, a non-uniform thickness preloading structure is provided in the aperture of the ultrasonic transducer to control local bending modes that affect the operational stiffness of the ultrasonic transducer so as to minimize the mounting impedance of the ultrasonic transducer when it is operated at the higher resonant frequency.

According to embodiments of the invention, the mounting flange is not required to be attached to a common nodal displacement region of the higher and the lower resonant frequencies. Also, the piezoelectric driver stack need not be located at the center of mass of the ultrasonic transducer. In other words, it is not necessary to design the ultrasonic transducer such that the center of mass thereof is coincident with the center of the aperture of the ultrasonic transducer. Due to these arrangements, the selectable ranges of actuation frequencies of higher resonant and lower resonant frequencies are greatly improved compared to the ultrasonic transducers in prior art. Specifically, in prior art ultrasonic transducers, the higher resonant frequency must be less than 3 times the lower resonant frequency for higher resonance mode at 200 kHz to 300 kHz in order to obtain a pure axial actuation with high bending stiffness due to the structure and arrangement of the ultrasonic transducer. However, with the ultrasonic transducer provided in the embodiments of the invention, the higher resonant frequency may be more than 3 times of the lower resonant frequency.

Although the present invention has been described in considerable detail with reference to certain embodiments, other embodiments are possible. Therefore, the spirit and scope of the appended claims should not be limited to the description of the embodiments contained herein.

The invention claimed is:

1. An ultrasonic transducer configured to selectively operate at both a first resonant frequency in a first oscillatory mode where a first oscillatory wave is transmitted along a length of the transducer and a second resonant frequency in a second oscillatory mode where a second oscillatory wave is transmitted along the length of the transducer during wire bonding operations, the ultrasonic transducer comprising:

an elongated transducer body with an aperture for mounting a piezoelectric driver stack for driving the ultrasonic transducer to operate at the first or second resonant frequency, wherein the transducer body is dimensioned such that its length is substantially equal to two wavelengths of the first oscillatory mode, and substantially equal to a half wavelength of the second oscillatory mode, a mounting flange connected to the transducer body at a first nodal vibration region of the transducer body associated with the first oscillatory mode, and a first connecting member having a first end connected to the mounting flange and a second end connected to the transducer body at a second nodal vibration region associated with the first oscillatory mode.

2. The ultrasonic transducer according to claim 1, wherein the first resonant frequency is between 200 kHz and 300 kHz, and the second resonant frequency is between 50 kHz and 100 kHz.

3. The ultrasonic transducer according to claim 1, wherein the transducer body has a first end and a second end opposite to the first end, the aperture being closer to the first end than the second end.

4. The ultrasonic transducer according to claim 3, wherein a bonding tool is attached to the second end of the transducer body.

5. The ultrasonic transducer according to claim 1, further comprising at least one preloading element located in the aperture to provide a preloading structure having a non-uniform thickness for generating a preload force against the piezoelectric driver stack to minimize vibration and rotation of the transducer body.

6. The ultrasonic transducer according to claim 1, wherein the mounting flange is connected to the transducer body through a second connecting member extending between the mounting flange and the transducer body at the first nodal vibration region of the transducer body.

7. The ultrasonic transducer according to claim 6, wherein the second connecting element includes at least one flexure extending between the mounting flange and the transducer body.

8. The ultrasonic transducer according to claim 1, wherein the rigid connecting member includes a first portion extending from the second nodal vibration region of the transducer body in a direction perpendicular to an axial direction of the transducer body, and a second portion extending from the first portion along the axial direction of the transducer body, the second portion being connected to the mounting flange.

9. The ultrasonic transducer according to claim 8, wherein a ratio Rh of a height of the first portion in a first direction perpendicular to the axial direction of the transducer body to a thickness of the second portion in a second direction perpendicular to the axial direction of the transducer body is selected such that: $RH^2>Rb$, where Rb refers to a predetermined ratio of a bending stiffness around the second direction to a bending stiffness about the first direction.

10. The ultrasonic transducer according to claim 9, wherein the predetermined ratio is 10, and the height of the first portion in the second direction is not less than 3.2 times the thickness of the second portion in the first direction.

11. The ultrasonic transducer according to claim 1, wherein the first nodal vibration region is located adjacent to the aperture, and a distance between the second nodal vibration region and a bonding tool is smaller than a distance between the first nodal vibration region and the bonding tool.

12. The ultrasonic transducer according to claim 1, wherein each of the first and the second nodal vibration regions has a vibration amplitude not higher than 10% of a maximum vibration amplitude thereof when the ultrasonic transducer is operated at the first resonant frequency.

13. The ultrasonic transducer according to claim 1, wherein when the ultrasonic transducer is operated at the second resonant frequency, a first vibration point at the first nodal vibration region of the transducer body and a second vibration point at the second nodal vibration region oscillate at substantially equal and opposite vibration amplitudes.

14. The ultrasonic transducer according to claim 1, wherein the second resonant frequency is less than one third of the first resonant frequency.

15. The ultrasonic transducer according to claim 1, wherein the mounting flange includes first and second flange elements that are disposed symmetrically on opposite sides of the transducer body.

16. The ultrasonic transducer according to claim 15, further comprising a second connecting element extending between the first flange element and the transducer body, and a third connecting element extending between the second flange element and the transducer body.

17. The ultrasonic transducer according to claim 16, wherein the second and the third connecting elements are respectively located at first and second points at the second nodal vibration region on the transducer body, the first and second points of the second nodal vibration region being symmetrically located on opposite sides of the transducer body.

18. The ultrasonic transducer according to claim 15, further comprising a fourth connecting element, wherein the first and the fourth connecting elements are arranged symmetrically on opposite sides of the transducer body, the fourth connecting element having first and second ends, wherein the first end of the first connecting element is connected to the transducer body at a first point at the first nodal vibration region, and the second end of the first connecting element is connected to the first flange element, and the first end of the fourth connecting element is connected to a second point at the first nodal vibration region, and the second end of the fourth connecting element is connected to the second flange element, and wherein the first and second points of the first nodal vibration region are symmetrically located on opposite sides of the transducer body.

19. An ultrasonic wire bonding device comprising an ultrasonic transducer according to claim 1.

* * * * *